(12) United States Patent
Oi et al.

(10) Patent No.: US 7,276,568 B2
(45) Date of Patent: *Oct. 2, 2007

(54) COPOLYMER, ADHESIVE CONTAINING THE SAME AND LAMINATE

(75) Inventors: Nobuo Oi, Narashino (JP); Akihiro Kondo, Ichihara (JP); Toshiki Mori, Osaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/487,997

(22) Filed: Jul. 18, 2006

(65) Prior Publication Data

US 2006/0258787 A1    Nov. 16, 2006

Related U.S. Application Data

(62) Division of application No. 10/024,244, filed on Dec. 21, 2001, now Pat. No. 7,193,003.

(30) Foreign Application Priority Data

Dec. 27, 2000  (JP) ............................ 2000-398538
Jul. 2, 2001    (JP) ............................ 2001-200548

(51) Int. Cl.
*C08F 210/14*    (2006.01)

(52) U.S. Cl. ...................... 526/308; 526/348

(58) Field of Classification Search ............... 526/308, 526/348

See application file for complete search history.

(56) References Cited

U.S. PATENT DOCUMENTS 4,226,965 A  * 10/1980 Grigoriev et al. ........... 526/116
4,311,810 A     1/1982  Fujii et al.
4,798,866 A     1/1989  Yoshitake et al.
5,559,164 A     9/1996  Babu et al.
5,844,055 A    12/1998  Brandt et al.
6,288,193 B1 * 9/2001  Iseki et al. ............... 526/348.6

FOREIGN PATENT DOCUMENTS

| DE | 199 51 277 A1 | 5/2000 |
| EP | 0 128 587 A2 | 12/1984 |
| EP | 0 253 625 | 1/1988 |
| JP | 59-164316 * | 9/1984 |
| JP | 59-164316 A | 9/1984 |
| JP | 59-232103 A | 12/1984 |
| JP | 64-14213 A | 1/1989 |
| JP | 7510569 | 2/1995 |
| WO | WO-93/11184 A1 | 6/1993 |
| WO | WO-93 21242 | 10/1993 |

OTHER PUBLICATIONS

B. Lofgren et al., Organometallic Catalysts and Olefin Polymerization New Millenium International Conference, Jun. 18-2, 2000, Oslo, Norway.
R. Mani et al., Polymer, vol. 34, No. 9, 1941-1943 (1993).
L. A. Nekhaeva et al., Polymer Science USSR, vol. 32, No. 9, 1868-1872 (1990).
P. Longo et al., Macromol. Chem., vol. 191, 2387-2396 (1990).

* cited by examiner

*Primary Examiner*—Roberto Rabago
(74) *Attorney, Agent, or Firm*—Birch, Stewart, Kolasch & Birch, LLP

(57) ABSTRACT

A copolymer of a strait chain α-olefin and a vinyl compound (I) represented by the general formula $CH_2=CH-R$, wherein R is a hydrocarbon group, the steric parameter Es of the substituent R is −1.64 or less and the steric parameter B1 of the substituent R is 1.53 or more, an adhesive containing the same as an effective ingredient, and an laminate containing the adhesive.

2 Claims, 5 Drawing Sheets

COPOLYMER, ADHESIVE CONTAINING THE SAME AND LAMINATE

CROSS-REFERENCE TO RELATED APPLICATIONS

The present application is a 37 C.F.R. § 1.53(b) divisional of U.S. application Ser. No. 10/024,244 filed Dec. 21, 2001, now U.S. Pat. 7,193,003, which claims priority on Japanese Patent Application Nos. 2000-398538 field Dec. 27, 2000, and 2001-200548 filed Jul. 2, 2001. The entire contents of each of these applications is hereby incorporated by reference.

BACKGROUND OF THE INVENTION

1. Field of the Invention

The present invention relates to a copolymer of a straight chain α-olefin and a specified vinyl compound, and use thereof. Particularly, the present invention relates to a copolymer of a straight chain α-olefin and a specified vinyl compound which is similar to a polyvinyl chloride and suitable for production of molded articles such as a film, sheet, pipe, to an adhesive containing the copolymer for polyolefin resins, and to a laminate excellent in adhesiveness between layers.

2. Description of Related Art

Generally, polymers used as stretched films, wrapping films or pipes are required to have viscoelasticity (elastic recoverability and delayed recoverability) and transparency as well as balance between flexibility and heat resistance like polyvinyl chloride. Polyvinyl chloride, however, is regarded as being problematic in relation to environmental pollution for the reason that it has a possibility to produce a harmful substance when burned. Though replacement of polyvinyl chloride with a polymer such as an ethylene copolymer is being studied now, it is an actual condition that any satisfactory substitute has not been obtained.

Further, though adhesives excellent in adhesiveness to olefin resins such as polyethylene, polypropylene or the like have been widely used for housing of domestic electric appliances, exterior parts of automobiles and the like, an adhesive further improved in adhesiveness has been recently required.

SUMMARY OF THE INVENTION

As results of intensive studies, the present inventors found a copolymer solving the above problems, and completed the present invention.

An object of the present invention is to provide a specific copolymer being capable of having a constitution not containing any halogen regarded as being problematic from the viewpoint of environmental pollution, and being excellent in transparency and balance between viscoelasticity and heat resistance.

Another object of the invention is to provide an adhesive containing the copolymer as an effective ingredient.

Further, another object of the invention is to provide a laminate excellent in adhesiveness between layers.

Other objects and advantages of the present invention will be apparent from descriptions below.

Namely, the present invention relates to a copolymer of a straight chain α-olefin and a vinyl compound (I) represented by the general formula $CH_2=CH-R$, wherein R is a hydrocarbon group, the steric parameter Es of the substituent R is −1.64 or less and the steric parameter B1 of the substituent R is 1.53 or more.

Further, the present invention provides an adhesive comprising the copolymer as an effective ingredient and a laminate obtained by laminating a layer containing the adhesive with an adherend.

DETAILED DESCRIPTION OF THE INVENTION

Figure 1:
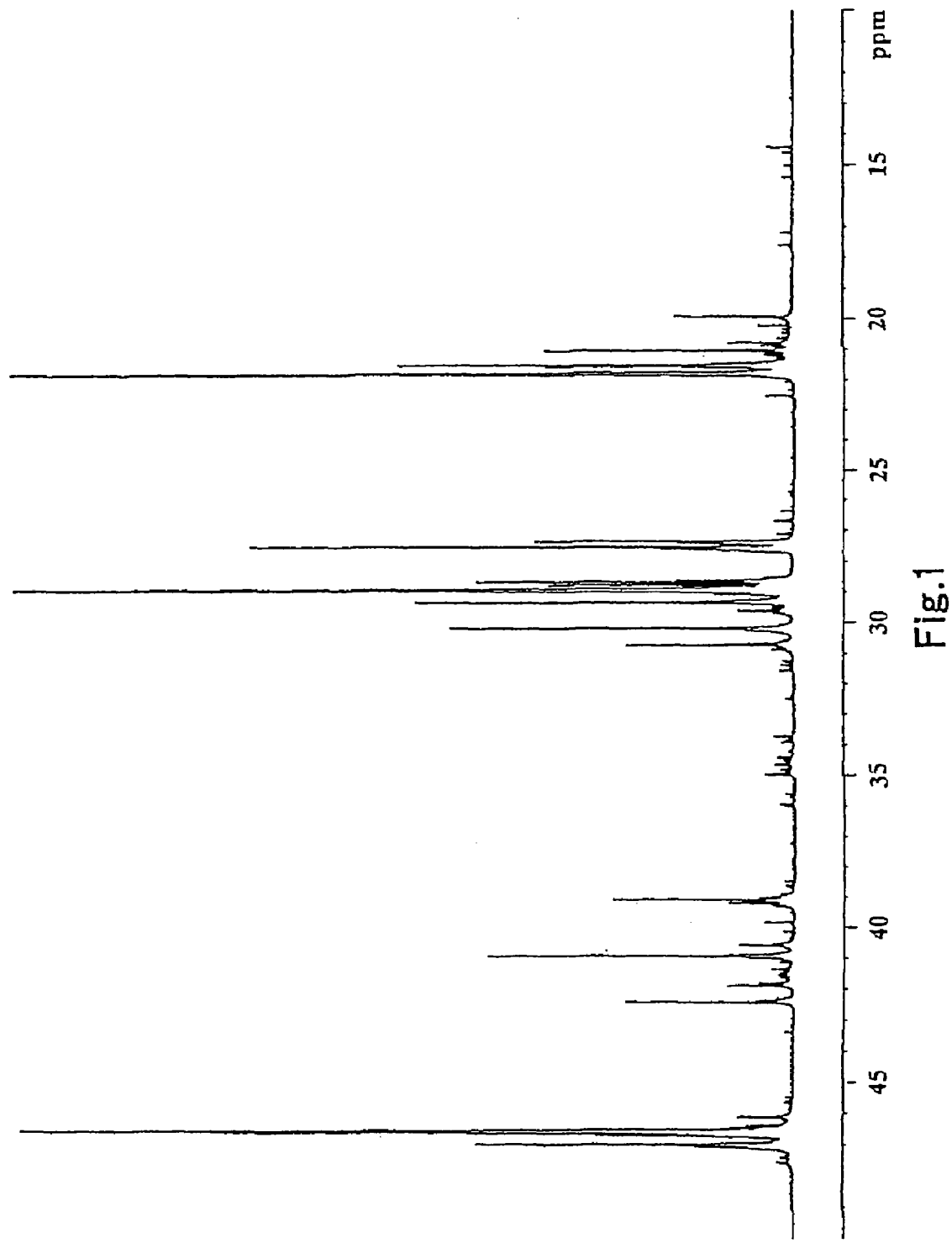
FIG. 1 is a $^{13}$C-NMR spectrum of the polymer obtained in Example 1.

The α-olefin used as a component of the copolymer of the present invention includes preferably a straight chain α-olefin having 3 to 20 carbon atoms, and specific examples thereof include propylene, 1-butene, 1-pentene, 1-hexene, 1-heptene, 1-octene, 1-nonene, 1 -decene and the like, preferably propylene, 1 -butene, 1-hexene and 1-octene, and more preferably propylene.

The vinyl compound (I) used in the present invention is a vinyl compound represented by $CH_2=CH-R$, containing a hydrocarbon group R of which steric parameters Es and B1 are within respective specified ranges.

Herein, the "steric parameters Es and B1" are parameters indicative of the steric bulkiness of a substituent (in detail, Es and B1 indicate three-dimensional extent and two-dimensional extent, respectively) and are determined by the method described in literature [C. Hansch and A. Leo: "Exploring QSAR Fundamentals and Applications in Chemistry and Biology" Chapter 3 (ACS Professional Reference Book, Washington, D.C. (1995))]. It is indicated that the smaller the value of Es is, the larger the three dimensional extent is, and the larger the value of B1 is, the larger the two dimensional extent is.

In the present invention, the steric parameter Es of the substituent R is −1.64 or less, preferably −3.10 to −1.70, more preferably −2.80 to −1.70, particularly preferably −2.35 to −1.75, and most preferably −2.10 to −1.75. while steric parameter B1 of the substituent R is 1.53 or more, preferably 1.53 to 2.90, more 1.70 to 2.70, and particularly preferably 1.91 to 2.60.

When the parameter Es is more than −1.64, or the parameter B1 is less than 1.53, the copolymer is inferior in elastic recoverability and delayed recoverability, and therefore it is not preferable.

The 3-positioned carbon in the vinyl compound (I) is preferably a tertiary or quaternary carbon because the copolymer obtained is excellent in elastic recoverability and delayed recoverability.

Specific examples of the vinyl compound (I) used in the present invention include vinylcyclopropane, vinylcyclobutane, vinylcyclopentane, vinylcyclohexane, vinylcycloheptane, vinylcyclooctane, vinylnorbornane, vinyladamantane, 3-methyl-1-butene, 3-methyl-1-pentene, 3-methyl-1-hexene, 3-methyl-1-heptene, 3-methyl-1-octene, 3,3-dimethyl-1-butene, 3,3-dimethyl-1-pentene, 3,3-dimethyl-1-hexene, 3,3-dimethyl-1-heptene, 3,3-dimethyl-1-octene, 3,4-dimethyl-1-pentene, 3,4-dimethyl-1-hexene, 3,4-dimethyl-1-heptene, 3,4-dimethyl-1-octene, 3,5-dimethyl-1-hexene, 3,5-dimethyl-1-heptene, 3,5-dimethyl-1-octene, 3,6-dimethyl-1-heptene, 3,6-dimethyl-1-octene, 3,7-dimethyl-1-octene, 3,3,4-trimethyl-1-pentene, 3,3,4-trimethyl-1-hexene, 3,3,4-trimethyl-1-heptene, 3,3,4-trimethyl-1-octene, 3,4,4-trimethyl-1-pentene, 3,4,4-trimethyl-1-hexene, 3,4,4-trimethyl-1-heptene, 3,4,4-trimethyl-1-octene and the like, preferably vinylcyclopentane, vinylcyclohexane, vinylcycloheptane, vinylcyclooctane, vinylnorbornane, 3-methyl-1-butene, 3-methyl-1-pentene, 3-methyl-1-hexene, 3,3-dimethyl-1-butene, 3,3-dimethyl-1-pentene, 3,4-dimethyl-1-pentene, 3,5-dimethyl-1-hexene, 3,3,4-trimethyl-1-pentene and 3,4,4-trimethyl-1-pentene, particularly preferably vinylcyclohexane, vinylnorbornane, 3-methyl-1-butene, 3-methyl-1-pentene, 3,3-dimethyl-1-butene, 3,4-dimethyl-1-pentene and 3,3,4-trimethyl-1-pentene.

The values of steric parameters of a part of the vinyl compounds(I) are shown below.

| Compound | ES | B1 |
| --- | --- | --- |
| 3-methyl-1-butene | −1.71 | 1.90 |
| 3-methyl-1-pentene | −2.37 | 1.90 |
| Vinylcyclopentane | −1.75 | 1.90 |
| Vinylcyclohexane | −1.81 | 1.91 |

The straight chain α-olefin does not satisfy the above-limitation. The values of the steric parameters of some straight chain α-olefins and styrene which are not included in the vinyl compound (I) are shown below.

| Compound | ES | B1 |
| --- | --- | --- |
| Propylene | −1.24 | 1.52 |
| 1-butene | −1.31 | 1.52 |
| 1-octene | −1.54 | 1.52 |
| Styrene | −1.01 | 1.71 |

The vinyl compounds (I) in which a carbon atom excluding the carbon atom at 3-position has no branched structure are preferable. Herein, the branched structure means that the molecular skeleton is not straight chain structure and the structure has a skeleton branched through a tertiary or quaternary carbon. Specific examples of such a vinyl compounds (I) include 3-methyl-1-butene, 3-methyl-1-pentene, 3,3-dimethyl-1-butene and the like.

In the present invention, the vinyl compound (I) in which the hydrocarbon group R has a cyclic structure also preferable. Specific examples thereof include vinylcyclopropane, vinylcyclobutane, vinylcyclopentane, vinylcyclohexane, vinylcycloheptane, vinylcyclooctane, vinylnorbornane, vinyladamantane and the like.

The vinyl compound (I) in which a carbon atom excluding the carbon atom at 3-position has no branched structure and the hydrocarbon group R has a cyclic structure, is more preferable. The most preferable vinyl compound (I) is vinylcyclohexane.

In the copolymer of the present invention, the content of units derived from the vinyl compound (I) copolymerized (referred to simply as "vinyl compound (I) unit") has a wide range as 0.1 to 99.9 mol %. The content thereof can be easily determined by $^1$H-NMR spectrum or $^{13}$C-NMR spectrum method.

Further, when the content of the vinyl compound (I) unit is relatively low in the above range, a copolymer suitable for a film or sheet (particularly, stretched film and wrapping film) excellent in transparency, viscoelasticity and flexibility, and like plasticized polyvinyl chloride resin, is obtained. In this case, the content of the vinyl compound (I) unit is preferably 10 to 50 mol %, more preferably 15 to 45 mol %, particularly preferably 20 to 40 mol %, most preferably 25 to 35 mol %.

On the other hand, when the content of the vinyl compound (I) units is relatively high in the above range, a copolymer suitable for pipes and the like excellent in heat resistance, and like a hard polyvinyl chloride, is obtained. And, the content of the vinyl compound (I) unit is preferably 40 to 90 mol %, more preferably 50 to 90 mol %, particularly preferably 60 to 85 mol %, most preferably 65 to 85 mol %.

Moreover, from the viewpoint of adhesion performance, the content of the vinyl compound (I) unit is more preferably from 1 to 80 mol %, particularly preferably from 2 to 50 mol %.

Herein, the total content of the α-olefin units and the vinyl compound (I) unit is 100 mol %.

The straight chain α-olefin-vinyl compound (I) sequence in the polymer skeleton (inclusive of a branched polymer chain if present among molecular chains of the polymer) of the copolymer of the present invention is determined by $^{13}$C-NMR spectrum. In the skeleton, a structure in which one vinyl compound (I) unit is inserted between two straight chain α-olefin units, a structure in which two vinyl compound (I) units are connected, and a structure in which two straight chain α-olefin units are connected may exist. A copolymer having several kinds of combinations as above is excellent in viscoelasticity and flexibility, and therefore is preferable.

The copolymer of the present invention preferably has no double bond in all molecular structure (including the substituent R) except terminals of the copolymer from the view point of weatherability. A copolymer containing double bonds is also inferior in thermal stability, and problems such as generation of fish eyes by gelatin during molding process and the like, may occur.

From the viewpoint of mechanical strength and transparency, the copolymer preferably has a molecular weight distribution (Mw/Mn), which is expressed as a ratio of weight average molecular weight (Mw) to number average molecular weight (Mn), of 1.5 to 4.0, more preferably 1.5 to 3.5, particularly preferably 1.5 to 3.0.

Further, from the viewpoint of mechanical strength, the copolymer preferably has a weight average molecular weight (Mw) of from 5,000 to 1,000,000, more preferably 10,000 to 500,000, further preferably from 20,000 to 400,000, particularly preferably from 50,000 to 400,000.

In addition, from the viewpoint of adhesiveness, the copolymer preferably has a weight average molecular weight (Mw) of from 1,000 to 1,000,000, more preferably from 5,000 to 1,000,000, particularly preferably from 5,000 to 200,000.

Moreover, from the viewpoint of mechanical strength, the copolymer preferably has an intrinsic viscosity [η] measured in tetralin at 135° C. of 0.1 to 10.0 dl/g, more preferably 0.15 to 6.0 dl/g, particularly preferably 0.3 to 6.0 dl/g, most preferably 0.35 to 5.0 dl/g.

The copolymer of the present invention may be a copolymer containing one or more kinds of addition polymerizable monomer in addition to the straight chain α-olefin and the vinyl compound (I) unless the objects and effects of the present invention are damaged. Examples of the addition polymerizable monomers include a vinyl compound except ethylene, the vinyl compounds (I) and α-olefins.

Specific examples of thereof include vinyl ethers such as methyl vinyl ether, ethyl vinyl ether; (meth)acrylic acids or alkyl esters thereof such as acrylic acid, methyl acrylate, ethyl acrylate, methyl methacrylate; acrylonitrile; and vinyl esters of carboxylic acids such as vinyl acetate. One or more of them are preferably used.

The copolymer of the present invention can be prepared by, for example, copolymerizing the straight chain α-olefin and the vinyl compound (I) in the presence of a catalyst obtained by bringing isopropylidenebis(indenyl)zirconium dichloride into contact with methylalumoxane. In this case, by appropriately varying the amounts of the straight chain α-olefin and the vinyl compound (I) to be introduced and the polymerization conditions such as polymerization temperature and polymerization time, it is possible to obtain copolymers having different copolymerization ratios of monomers, molecular weights or the like.

In the preparation method, use of some sorts of catalyst or some polymerization conditions may cause a homopolymer of the straight chain α-olefin or the vinyl compound (I) to be produced as a byproduct. In such a case, the copolymer of the present invention can be easily fractionated by performing solvent extraction using a Soxhlet's extractor or the like. Solvents to be used in such extraction can be appropriately selected depending on the sort of vinyl compound (I). For example, a homopolymer of the vinyl compound (I) such as polyvinylcyclohexane can be removed as an insoluble component in extraction using toluene as a solvent and a copolymer can be fractionated as a component soluble in the solvent.

Of course, the copolymer of the present invention may be used as it contains such a by-product unless there arises no problem in an intended application.

The copolymer of the present invention excellent in transparency and balance between viscoelasticity and thermal resistance, is suitably used as molded articles such as films, sheets or pipes similar to those made of polyvinyl chloride, containers or the like, and further as substrates of memory media such as compact discs, or lens.

Such a film, sheet, pipe or container can be obtained by a known molding method, for example, an inflation molding process comprising extruding a molten resin from a circular die and winding up a resulting film inflated like a tube, or a T-die extrusion molding process comprising extruding a molten resin from a linear die and winding up a resulting film or sheet, or other process such as calendering, blow molding, injection molding or profile extrusion molding.

The molded article according to the present invention is excellent in flexibility and viscoelasticity. The flexibility and viscoelasticity can be determined from a hysteresis curve obtained by subjecting the molded article to a tensile test.

The copolymer of the present invention may be combined with other material to form a multi-layered film, sheet or pipe having two or more layers. The film, sheet or pipe can be produced by any one of various known lamination processes such as co-extrusion process, dry-lamination process, sandwich lamination process and extrusion lamination, and the like. Usable as other material are known materials such as paper, paperboard, aluminum thin film, cellophane, nylon, polyethylene terephthalate (PET), polypropylene, polyvinylidene chloride, ethylene-vinyl alcohol copolymer (EVOH), and various adhesive resins.

The copolymer used as a molded article may contain a known polymer material such as a radical polymerized low density polyethylene, high density polyethylene, linear low density polyethylene, ethylene-a straight chain α-olefin copolymer elastomer, polypropylene, polystyrene, polyphenylene ether, polyethylene telephthalate or the like.

The molded article such as a film, sheet or pipe may be subjected to a known post-treatment such as corona discharge treatment, plasma treatment, ozone treatment, ultraviolet irradiation, electron beam irradiation or the like.

The copolymer may contain stabilizers such as phenol type stabilizers, phosphite type stabilizers, amine type stabilizers, amide type stabilizers, anti-aging agents, weathering agents, anti-precipitating agent, anti-oxidants, thermal stabilizers, light stabilizers; additives such as thixotropy controlling agents, puffing agent, antifoaming agents, surface controlling agents, pigment dispersants, antistatic agents, lubricants, nucleating agents, flame retardants, processing oil, dyestuff and the like; pigments such as a transition metal compound such as titanium oxide (rutile type), zinc oxide, carbon black and the like; and organic or inorganic fillers such as glass fiber, carbon fiber, potassium titanate fiber, wollastonite, calcium carbonate, calcium sulfate, talc, glass flakes, barium sulfate, clay, fine powdery silica, mica, calcium silicate, aluminum hydroxide, magnesium hydroxide, magnesium oxide, alumina, celite and the like.

Further, the copolymer of the present invention can be applied to an adhesive containing the copolymer as an effective ingredient. The adhesive containing the copolymer as an effective ingredient exhibits an excellent adhesive property to various resins such as a polyolefin resin.

The adhesive may contain a solvent such as water, an aromatic hydrocarbon (e.g. toluene, xylene), an aliphatic hydrocarbon (e.g. hexane), an ester (e.g. ethyl acetate, butyl acetate), a ketone (e.g. methyl ethyl ketone, methyl isobutyl ketone), an alcohol (e.g. methanol, isopropanol, ethylene glycol, propylene glycol), or the like. The content of the solvent in the adhesive is usually 150 to 3000 parts by weight, preferably 200 to 2000 parts by weight per 100 parts by weight of the copolymer. When the adhesive contains a solvent, the copolymer, a stabilizer, an additive, pigment, filler and the like as described above may be dissolved or dispersed in the solvent.

The laminate of the present invention is a laminate prepared by laminating a layer of the adhesive with an adherend can be obtained by adhering the adhesive to the adherend. As adherends, there are listed polyolefin resins and rubbers such as polypropylenes, polyethylenes (e.g. radical polymerized low density polyethylene, high density polyethylene, linear low density polyethylene), ethylene-propylene copolymers, ethylene-propylene-diene copolymers, styrene-butadiene-styrene block copolymers, and the like; polar group-containing thermoplastic resins such as polyesters (e.g. polyethylene terephthalate (PET)), polyvinyl chlorides, polyamide resins, (meth)acrylate resins, ethylene-(meth)acrylate resins, ethylene-vinyl acetate resins and the like; polar group-containing thermosetting resins such as epoxy resins, urethane resins, urea formaldehyde resins and the like; inorganic materials such as metals (e.g. aluminum plate, aluminum foil), glass, cement and the like; cellulose polymer materials such as paper, cellophane, paperboard, woods and the like.

In the laminate, two kinds of adherends may be used.

In these adherends, polar group-containing thermoplastic resins and polyolefin resins are preferable, and polypropylenes are more preferable.

The adherend may contain a stabilizer, additive, pigment, filler, solvent and the like, mentioned above.

Examples of the producing method of the laminate include, for example, a method comprising piling an adherend, the adhesive (the copolymer) and an adherend in this order, and hot-pressing them; a method comprising applying a solution-like adhesive on a adherend, drying the resultant, and laminating another adherend; a method comprising applying a solution-like adhesive on an adherend, and then a solution in which a material forming an adherend is dissolved, and heating them to adhere and laminate them; and a method comprising co-extruding an adherend, the copolymer and an adherend to prepare a laminate.

The solution in which a material forming an adherend is dissolved, includes, for example, a solution containing a polar group-containing thermoplastic resin or polar group-containing thermosetting resin, and a pigment, solvent and the like. The solution can be treated as a paint.

Namely, the adhesive of the present invention is used as an adhesive for improving an adhesiveness between a substrate and a paint, and in this case, adherends are on both sides of the adhesive layer in a laminate, one of adherends is the substrate, and the other is a coating of the paint. As the paint, two or more kinds of the polar group-containing thermoplastic resins or polar group-containing thermosetting resins may be mixed and used, further at least one kind of paints may be applied two or more times.

Other examples of use mode of the adhesive of the present invention, include a use mode as an adhesive for adhering a substrate having a shape of a console box for an automobile, bumper or the like and a shaped decorated film having the same shape as that of the substrate prepared by thermoforming a decorated film having a pattern like grain of wood.

The present invention will be described in more detail by way of Examples and Comparative Examples. However, the present invention is not limited thereto.

The properties of each copolymer in the Examples were determined by the following methods.

(1) The intrinsic viscosity [η] was measured at 135° C. with an Ubbellohde viscometer using tetralin as a solvent.

(2) The molecular weight and the molecular weight distribution were determined using the following two types of gel permeation chromatograph. It is to be noted that the molecular weight distribution was evaluated as a ratio of weight average molecular weight to number-average molecular weight(Mw/Mn).
Type: 150-C manufactured by Waters
Column: Shodex packed column 80M
Temperature for the measurement: 140° C.
Solvent for the measurement: orthodichlorobenzene
Concentration for the measurement: 1 mg/ml (3) The glass transition point was measured using a DSC (SSC-5200 manufactured by SEIKO INSTRUMENT CO.) under the following conditions and was determined from its inflection point.
Heating: from 20° C. to 200° C. (20° C./min), kept for 10 min.
Cooling: from 200° C. to −50° C. (20° C./min), kept for 10 min.
Measurement: from −50° C. to 300° C. (20° C./min)

(4) The content of a vinylcyclohexane unit in a copolymer and the structure of the copolymer were determined by $^{13}$C-NMR analysis.
13C-NMR apparatus: DRX600 manufactured by BRUKER CO.
Solvent for the measurement: mixture of orthodichlorobenzene and orthodichlorobenzene-d4 at a ratio of 4:1 (volume ratio)
Temperature for the measurement: 135° C.

EXAMPLE 1

Into a 400 ml-autoclave having an atmosphere replaced with argon were introduced 137 ml of vinylcyclohexane and 49 ml g of dehydrated toluene. After heating to 30° C., propylene was charged therein to 0.4 MPa. Further, 5.6 ml of a solution of methylalumoxane in toluene [MMAO produced by Tosoh Akzo Corp., Al atom converted concentration=6 wt %] and a mixture of 4.3 mg of isopropylidenebis (indenyl)zirconium dichloride dissolved in 8.7 ml of dehydrated toluene were charged. The reaction liquid was stirred for one hour and then poured into 500 ml of methanol, and a precipitated white solid was collected through filtration. The solid was washed with methanol and then dried under reduced pressure, to obtain 44.7 g of a polymer.

The polymer had an intrinsic viscosity [η] of 0.16 dl/g, number average molecular weight of 9,000, molecular weight distribution (Mw/Mn) of 2.0, melting point of 93° C., glass transition point of −8° C., and vinylcyclohexane unit content of 7.6 mol %. A pressed sheet formed of the polymer had a very high transparency and was excellent in flexibility and elastic recoverability. The $^{13}$C-NMR spectrum of the polymer thus obtained is shown in FIG. 1.

EXAMPLE 2

Into a 300 ml-glass reactor replaced with argon were introduced 68 ml of vinylcyclohexane and 17 ml of dehydrated toluene. After heating to 30° C., propylene was bubbled for 15 minutes to replace argon with propylene. Further, 5.6 ml of a solution of methylalumoxane in toluene [MMAO produced by Tosoh Akzo Corp., Al atom converted concentration=6 wt %] was charged and then a mixture of 4.3 mg of isopropylidenebis(indenyl)zirconium dichloride in 8.7 ml of dehydrated toluene was charged. The reaction liquid was stirred for one hour and then poured into 500 ml of methanol, and a precipitated white solid was collected through filtration. The solid was washed with methanol and then dried under reduced pressure, to obtain 29.0 g of a polymer.

Figure 2:
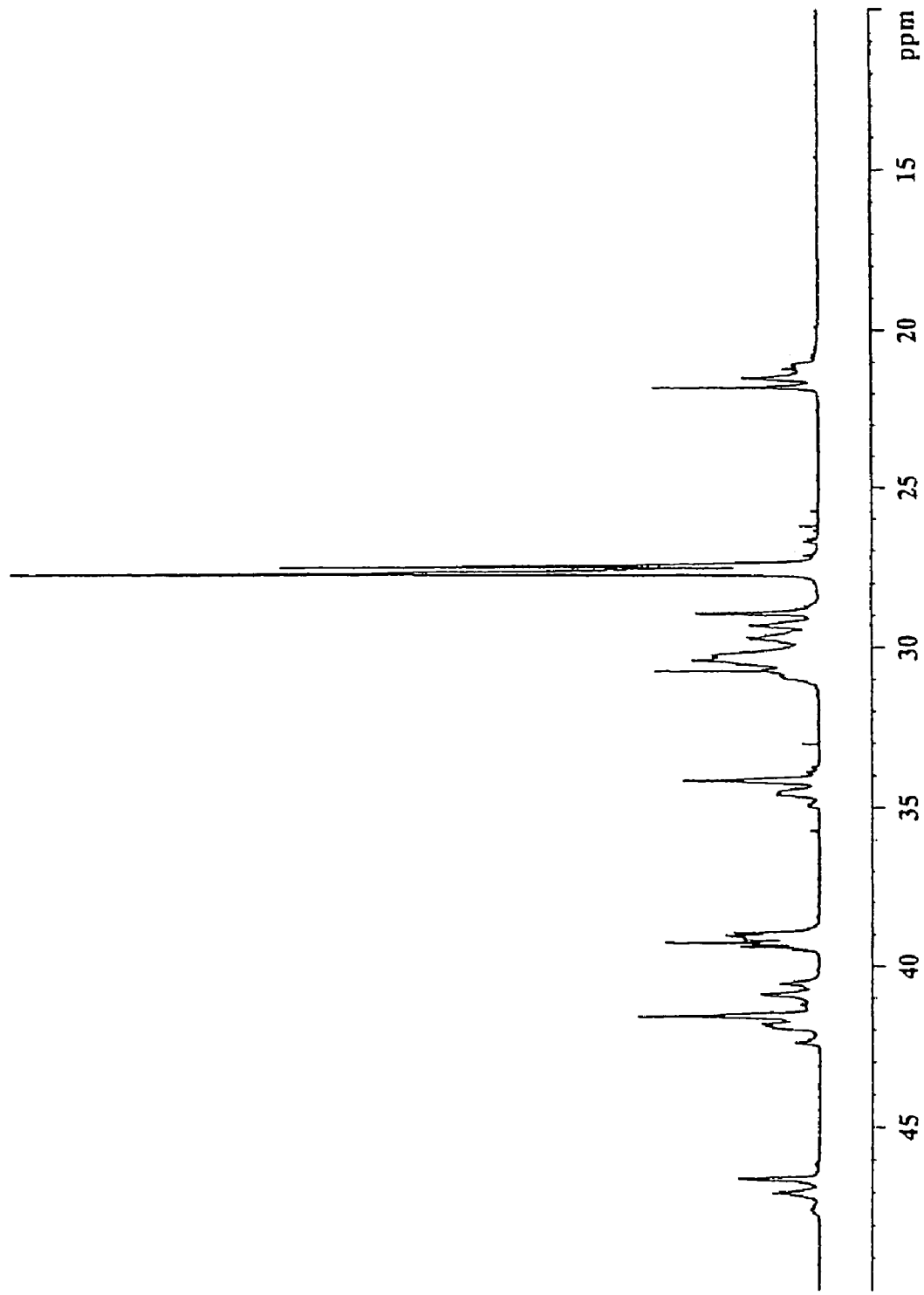
FIG. 2 is a $^{13}$C-NMR spectrum of the polymer obtained in Example 2.

The polymer had an intrinsic viscosity [η] of 0.18 dl/g, glass transition point of 62° C., and vinylcyclohexane unit content in the polymer of 55 mol %. A pressed sheet formed of the polymer has a very high transparency. The $^{13}$C-NMR spectrum of the polymer thus obtained is shown in FIG. 2.

EXAMPLE 3

The same operation as in Example 2 except that the amount of charged vinylcyclohexane was changed from 68 ml to 192 ml and dehydrated toluene was not used, was carried out to give 28.1 g of a polymer. The polymer had an intrinsic viscosity [η] of 0.19 dl/g, glass transition point of 77° C., and vinylcyclohexane unit content in the polymer of 67 mol %. A pressed sheet formed of the polymer has a very high transparency.

Figure 3:
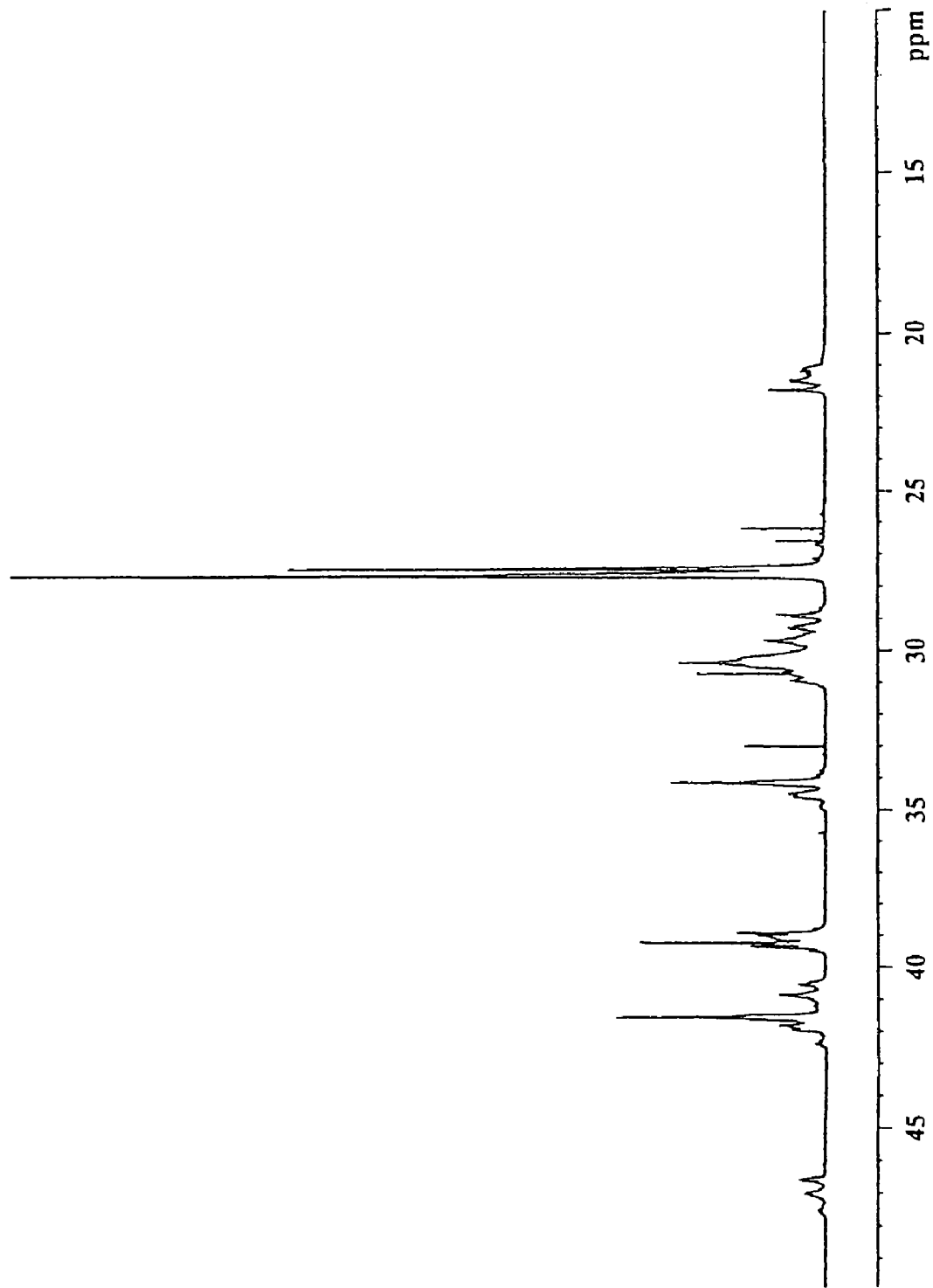
FIG. 3 is a $^{13}$C-NMR spectrum of the polymer obtained in Example 3.

The $^{13}$C-NMR spectrum of the polymer thus obtained is shown in FIG. 3.

EXAMPLE 4

[Production of Copolymer]

Into a 5000 ml-autoclave replaced with argon were introduced 441 g of vinylcyclohexane and 1242 g of dehydrated toluene. After heating to 30° C., propylene was charged therein to 0.4 MPa. Further, 15.6 ml of a solution of methylalumoxane in toluene [MMAO produced by Tosoh Akzo Corp., Al atom converted concentration=6 wt %] and a previously prepared mixture of 8.7 mg of isopropylidenebis(indenyl)zirconium dichloride dissolved in 8.7 ml of dehydrated toluene and 1.1 ml of the foregoing toluene solution of methylalumoxane were charged. The reaction liquid was stirred for one hour and then poured into 6000 ml of methanol, and a precipitated white solid was collected through filtration. The solid was washed with methanol and then dried under reduced pressure, to obtain 243 g of a polymer.

Figure 4:
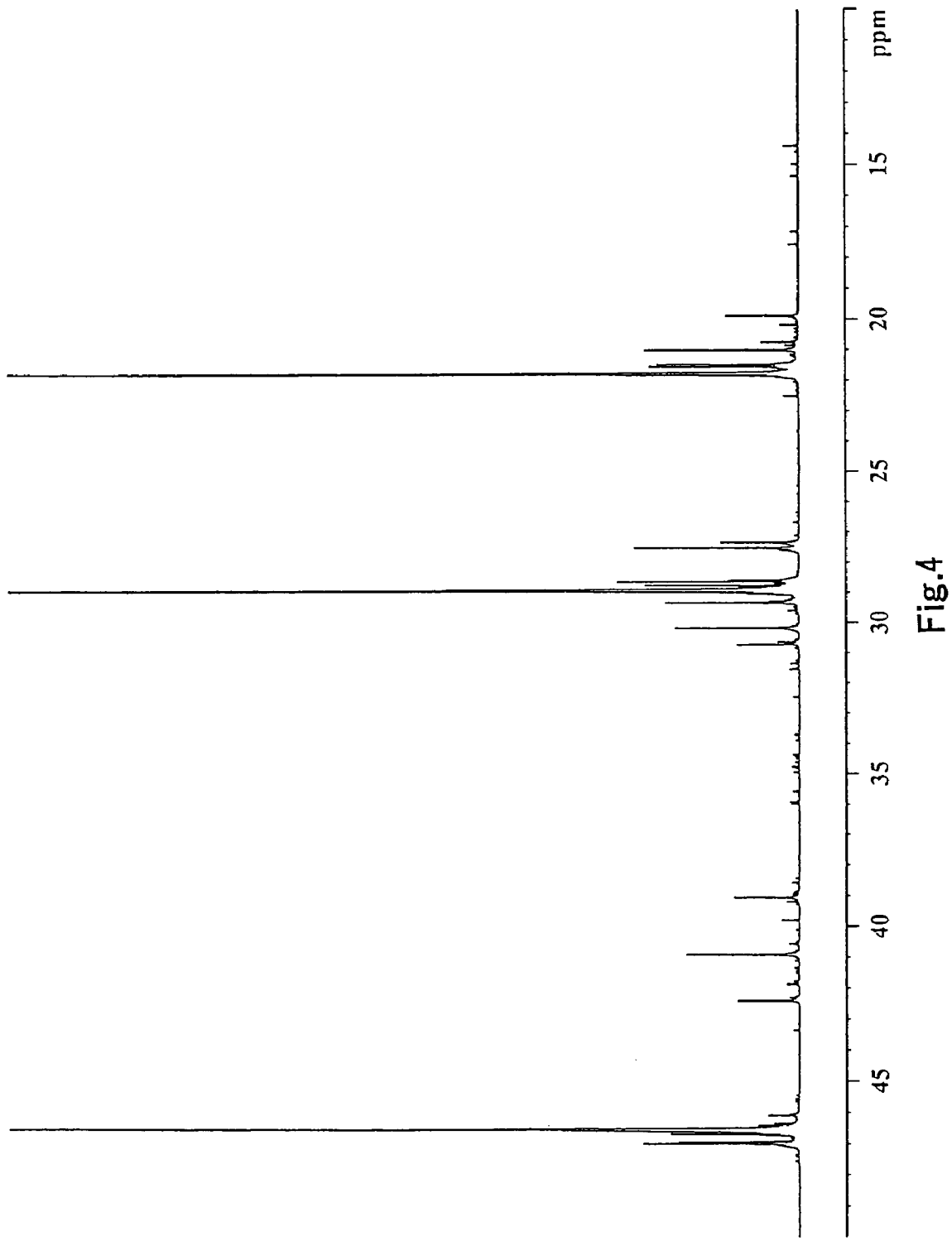
FIG. 4 is a $^{13}$C-NMR spectrum of the polymer obtained in Example 4.

The polymer had an intrinsic viscosity [η] of 0.18 dl/g, number average molecular weight of 10,000, molecular weight distribution (Mw/Mn) of 2.1, melting point of 116° C., glass transition point of −5° C., and vinylcyclohexane unit content of 3 mol %. A pressed sheet formed of the polymer had a very high transparency and was excellent in flexibility and elastic recoverability. The $^{13}$C-NMR spectrum of the polymer thus obtained is shown in FIG. 4.

[Preparation Example of Adhesive and Laminate]

A steel plate (4 mm in thickness), aluminum plate (200 μm), polytetrafluoroethylene sheet (200 μm), the polymer obtained in the Example 4 [production of copolymer] and 50 μm PET(polyethylene telephthalate) frame], polytetrafluoroethylene sheet (200,μm), aluminum plate (200 μm) and steel plate (4 mm in thickness) were piled in these order and hot-pressed at 180° C. under a pressure of 5 MPa with a hot press molding machine to obtain a sheet-like adhesive.

Next, an aluminum foil, an adherend (a polypropylene film having a thickness of 100 μm), the sheet-like adhesive, an adherend (the polypropylene sheet having a thickness of 2 mm) and an aluminum foil from the top were successively laminated in these order, and thus obtained laminate was kept under 180° C. under a pressure of 0.3 MPa for 3 seconds to adhere a part of the laminate (25 mm width). After peeling off the aluminum foils, the laminate was allowed to stand for 1 hour at a temperature of 23° C. at a humidity of 50%. Thereafter, the laminate was cut to 10 mm width×100 mm length (adhered length of 25 mm), parts not adhered of the laminate were held and peel test was carried out at a peeling rate of 100 mm/second at peel angle of 180°. The peel strength to the polypropylene was 5.9(N/10 mm).

EXAMPLE 5

Into a 400 ml-autoclave having an atmosphere replaced with argon were introduced 137 ml of vinylcyclohexane and 43 ml g of dehydrated toluene. After heating to 30° C., propylene was charged therein to 0.4 MPa. Further, 7.1 ml of a solution of methylalumoxane in toluene [MMAO produced by Tosoh Akzo Corp., Al atom converted concentration=6 wt %] and a mixture of 6.5 mg of isopropylidenebis(indenyl)zirconium dichloride dissolved in 13.0 ml of dehydrated toluene were charged. The reaction liquid was stirred for two hours and then poured into 500 ml of methanol, and a precipitated white solid was collected through filtration. The solid was washed with methanol and then dried under reduced pressure, to obtain 105.7 g of a polymer.

Figure 5:
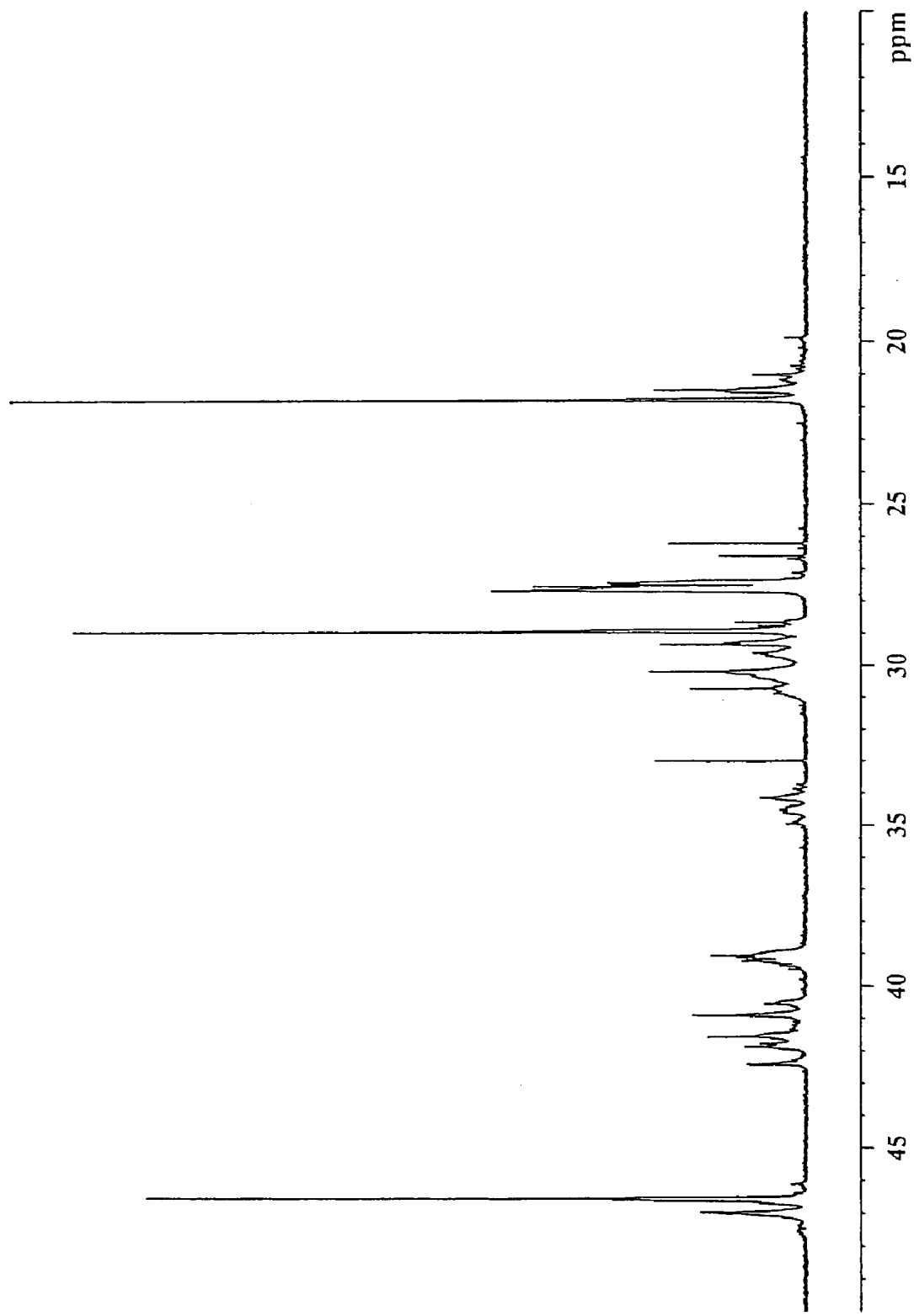
FIG. 5 is a $^{13}$C-NMR spectrum of the polymer obtained in Example 5.

The polymer had an intrinsic viscosity [η] of 0.15 dl/g, number average molecular weight of 8,000, molecular weight distribution (Mw/Mn) of 2.3, glass transition point of 10° C., and vinylcyclohexane unit content of 27 mol %. The $^{13}$C-NMR spectrum of the polymer thus obtained is shown in FIG. 5.

A laminate was prepared and the peel strength of the laminate was measured in the same manner as in Example 4 [Preparation Example of adhesive and laminate] except that the copolymer obtained in Example 5 was used as an adhesive.

The peel strength to the polypropylene was 4.0(N/10 mm).

As described above, according to the present invention, there is provided a copolymer that is capable of having a constitution not containing any halogen regarded as being problematic from the viewpoint of environmental pollution, the copolymer being excellent in transparency, viscoelasticity and adhesiveness as well as in balance between flexibility and heat resistance, and a molded article, adhesive and laminate using the same.

The invention claimed is:

1. A binary copolymer of a straight chain α-olefin and vinylcyclohexane, wherein said binary copolymer has:
   (1) straight chain α-olefin units in an amount of from 50 to 98% by mol and vinylcyclohexane units in an amount from 2 to 50% by mol, the total amounts of the straight chain α-olefin units and vinylcyclohexane units being 100 mol % by mol,
   (2) a weight average molecular weight (Mw) of from 20,000 to 400,000,
   (3) a structure wherein one vinylcyclohexane unit is inserted between two straight chain α-olefin units,
   (4) a structure wherein two vinylcyclohexane units are connected to each other, and
   (5) a structure wherein two straight chain α-olefin units are connected to each other.

2. The binary copolymer of a straight chain α-olefin and vinylcyclohexane according to claim 1, wherein the straight chain α-olefin is propylene.

* * * * *